United States Patent
Renken et al.

(10) Patent No.: US 10,675,950 B2
(45) Date of Patent: Jun. 9, 2020

(54) SYSTEM AND METHOD OF TEMPERATURE CONTROL FOR A TRANSPORT REFRIGERATION SYSTEM

(71) Applicant: THERMO KING CORPORATION, Minneapolis, MN (US)

(72) Inventors: David J. Renken, Prior Lake, MN (US); Mark D. Leasure, Eagan, MN (US); Duncan Thomas Lasley, Minneapolis, MN (US); Kenneth James Gleeson, Galway (IE); Peter Van Calligan, Minneapolis, MN (US); Scott A. Munns, Onalaska, WI (US)

(73) Assignee: Thermo King Corporation, Minneapolis, MN (US)

( * ) Notice: Subject to any disclaimer, the term of this patent is extended or adjusted under 35 U.S.C. 154(b) by 290 days.

(21) Appl. No.: 15/037,174

(22) PCT Filed: Nov. 18, 2014

(86) PCT No.: PCT/US2014/066156
§ 371 (c)(1),
(2) Date: May 17, 2016

(87) PCT Pub. No.: WO2015/074051
PCT Pub. Date: May 21, 2015

(65) Prior Publication Data
US 2016/0272049 A1    Sep. 22, 2016

Related U.S. Application Data

(60) Provisional application No. 61/905,380, filed on Nov. 18, 2013.

(51) Int. Cl.
*B60H 1/32* (2006.01)
*F25B 49/02* (2006.01)
(Continued)

(52) U.S. Cl.
CPC ....... *B60H 1/3232* (2013.01); *B60H 1/00378* (2013.01); *B60H 1/3211* (2013.01);
(Continued)

(58) Field of Classification Search
CPC ...... F25B 2400/0409; F25B 2400/0411; F25B 2600/2501; F25B 2600/2511; F25B 2600/2521
(Continued)

(56) References Cited

U.S. PATENT DOCUMENTS 3,933,004 A * 1/1976 Carter ........................ F25B 1/00
                                                    237/2 B
4,838,037 A    6/1989 Wood
(Continued)

FOREIGN PATENT DOCUMENTS

CN    101501412    8/2009
CN    101901017    12/2010
(Continued)

OTHER PUBLICATIONS

Chinese Office Action issued in corresponding Chinese Application No. 201480073415 dated Jun. 23, 2017 (10 pages).
(Continued)

*Primary Examiner* — Marc E Norman
*Assistant Examiner* — Schyler S Sanks
(74) *Attorney, Agent, or Firm* — Hamre, Schumann, Mueller & Larson, P.C.

(57) ABSTRACT

A system and method for temperature control for a Transport Refrigeration System (TRS) is provided. Particularly, a method for temperature control of an internal space of a refrigerated transport unit is provided. The method includes determining a measured internal space temperature within the internal space of the refrigerated transport unit. The method also includes calculating, via a TRS controller, a
(Continued)

temperature difference between the measured internal space temperature and a desired set point temperature. Also, the method includes adjusting, via the TRS controller, a duty cycle percentage of a liquid line solenoid valve and/or a hot gas solenoid valve based on the temperature difference to control an amount of refrigerant directed to the thermal expansion device and the evaporator and/or an amount of hot gas directed to the evaporator.

15 Claims, 6 Drawing Sheets

(51) Int. Cl.
| | | |
|---|---|---|
| *F25B 41/04* | (2006.01) | |
| *F25B 5/02* | (2006.01) | |
| *F25D 29/00* | (2006.01) | |
| *B60H 1/00* | (2006.01) | |
| *B60P 3/20* | (2006.01) | |
| *F25B 47/02* | (2006.01) | |

(52) U.S. Cl.
CPC .................................. *B60P 3/20* (2013.01); *F25B 5/02* (2013.01); *F25B 41/04* (2013.01); *F25B 49/02* (2013.01); *F25D 29/003* (2013.01); *B60H 2001/3264* (2013.01); *F25B 47/022* (2013.01); *F25B 2400/0403* (2013.01); *F25B 2400/0411* (2013.01); *F25B 2500/18* (2013.01); *F25B 2500/19* (2013.01); *F25B 2600/23* (2013.01); *F25B 2600/2501* (2013.01); *F25B 2600/2515* (2013.01); *F25B 2600/2521* (2013.01); *F25B 2700/2104* (2013.01); *F25B 2700/21171* (2013.01)

(58) Field of Classification Search
USPC .......................................................... 62/200
See application file for complete search history.

(56) References Cited

U.S. PATENT DOCUMENTS

| | | | | |
|---|---|---|---|---|
| 4,899,549 | A | * | 2/1990 | Berge ...................... F25B 27/00 236/75 |
| 4,997,004 | A | * | 3/1991 | Barkhimer ........... F02M 47/027 137/596.17 |
| 5,035,119 | A | | 7/1991 | Alsenz |
| 5,163,301 | A | | 11/1992 | Cahill-O'Brien et al. |
| 5,284,024 | A | | 2/1994 | Hanson et al. |
| 5,402,652 | A | | 4/1995 | Alsenz |
| 5,415,008 | A | | 5/1995 | Bessler |
| 5,431,026 | A | | 7/1995 | Jaster |
| 5,435,145 | A | | 7/1995 | Jaster |
| 5,463,876 | A | | 11/1995 | Bessler et al. |
| 5,655,379 | A | | 8/1997 | Jaster et al. |
| 6,408,635 | B1 | | 6/2002 | Pham et al. |
| 6,708,507 | B1 | | 3/2004 | Sem et al. |
| 6,804,972 | B2 | * | 10/2004 | El-Habhab ......... B60H 1/00014 62/159 |
| 7,419,365 | B2 | | 9/2008 | Pham et al. |
| RE40,830 | E | | 7/2009 | Caillat |
| 7,654,098 | B2 | | 2/2010 | Pham et al. |
| 7,685,830 | B2 | | 3/2010 | Thybo et al. |
| 7,937,962 | B2 | | 5/2011 | Dudley et al. |
| 8,157,538 | B2 | | 4/2012 | Wallis et al. |
| 2001/0002239 | A1 | * | 5/2001 | Pham ........................ A47F 3/04 417/299 |
| 2007/0240870 | A1 | | 10/2007 | Hayashi et al. |
| 2010/0024450 | A1 | | 2/2010 | Waldschmidt et al. |
| 2010/0043469 | A1 | | 2/2010 | Lifson et al. |
| 2011/0127983 | A1 | * | 6/2011 | Peng ..................... H02M 3/157 323/283 |
| 2012/0000222 | A1 | | 1/2012 | Fink et al. |
| 2012/0247138 | A1 | | 10/2012 | Senf et al. |
| 2013/0123851 | A1 | | 5/2013 | Seme et al. |

FOREIGN PATENT DOCUMENTS

| | | |
|---|---|---|
| DE | 3943336 | 7/1990 |
| EP | 2182304 | 5/2010 |
| JP | 4959800 | 6/2012 |

OTHER PUBLICATIONS

International Search Report for International Application No. PCT/US2014/066156 dated Feb. 27, 2015 (3 pages).
Written Opinion for International Application No. PCT/US2014/066156 dated Feb. 27, 2015 (13 pages).

* cited by examiner

SYSTEM AND METHOD OF TEMPERATURE CONTROL FOR A TRANSPORT REFRIGERATION SYSTEM

FIELD

The disclosure herein relates to a transport refrigeration system. More particularly, the disclosure herein relates to a system and method of temperature control for a Transport Refrigeration System (TRS).

BACKGROUND

Existing TRSs are configured to work with containers, trailers, and other similar transport units to control a temperature inside a refrigerated transport unit. Conventionally, the TRS includes a Transport Refrigeration Unit (TRU) that is generally installed on one side of the refrigerated transport unit where conditioned air is blown into an internal space of the refrigerated transport unit. The TRU generally includes a compressor, a condenser coil, an expansion device and one or more evaporator coils to form a refrigeration circuit. The evaporator coil(s) may be configured to exchange heat with indoor air of, for example, the transport unit to regulate a temperature inside the transport unit. In some embodiments, the TRS may include a front side evaporator coil in the TRU that is configured to provide cooling and/or heating/defrosting to a front portion of the refrigerated transport unit and one or more remote evaporator units that each includes an evaporator coil configured to provide cooling and/or heating/defrosting to other portions of the refrigerated transport unit.

SUMMARY

The embodiments disclosed herein relate to a transport refrigeration system. More particularly, the embodiments disclosed herein relate to a system and method of temperature control for a TRS.

The embodiments described herein provide temperature control to a TRS by controlling the amount of refrigerant being introduced to a thermal expansion device and an evaporator coil of a refrigeration circuit of the TRS and/or controlling the amount of hot gas entering an evaporator unit/portion of the TRS.

In one embodiment, a refrigeration circuit for a TRS is provided that includes a liquid line solenoid valve that is positioned upstream of a thermal expansion device and an evaporator coil. By adjusting a duty cycle of the liquid line solenoid valve, the TRS can control the amount of refrigerant that is introduced to the thermal expansion device and the evaporator coil. One embodiment of the adaptive control method includes monitoring a return air temperature and adjusting a duty cycle of the liquid line solenoid valve based on the measured return air temperature.

In some embodiments, the refrigeration circuit also includes a hot gas solenoid valve that is positioned upstream of an evaporator coil. By adjusting a duty cycle of the hot gas solenoid valve, the TRS can control the amount of hot gas that enters an evaporator unit/portion of the TRS. In some embodiments the adaptive control method can include monitoring a return air temperature and adjusting a duty cycle of the hot gas solenoid valve based on the measured return air temperature.

Also, in some embodiments, the TRS can alternate in pulsing (e.g., rapidly entering an open state and a closed state) a liquid line solenoid valve and a hot gas solenoid valve to provide temperature control of the internal space of the refrigerated transport unit. In some embodiments, alternately pulsing the liquid line solenoid valve and the hot gas solenoid valve can include pulsing the liquid line solenoid valve while the hot gas solenoid valve remains in an open state for a period of time and then pulsing the hot gas solenoid valve while the liquid line solenoid valve remains in an open state for a period of time. In other embodiments, alternately pulsing the liquid line solenoid valve and the hot gas solenoid valve can include operating the liquid line solenoid valve in an open state while the hot gas solenoid valve is in a closed state and operating the hot gas solenoid valve in an open state while the liquid line solenoid valve is in a closed state.

In some embodiments, the liquid line solenoid valve and/or the hot gas solenoid valve is a high pulse count solenoid valve. A high pulse count solenoid valve is configured to be able to pulse (e.g., rapidly enter an open state and a closed state) reliably over an extended period of time. For example, unlike a conventional solenoid valve, in some embodiments, when the high pulse count solenoid valve is operating under a ~20 second time period, the high pulse count solenoid valve can reliably run about six million cycles over about a ten year period.

The embodiments described herein allow a TRS to vary the amount of refrigerant allowed to reach the thermal expansion device and the evaporator coil and/or vary the amount of hot gas allowed to reach the evaporator coil using a time based control. In some embodiments the liquid line solenoid valve and/or hot gas solenoid valve is either fully open or fully closed and has a fixed orifice. The amount of refrigerant passing through the liquid line solenoid valve and/or the amount of hot gas passing through the hot gas solenoid valve is varied by adaptively changing the amount of time the liquid line solenoid valve and/or the hot gas solenoid valve is allowed to stay in an open state.

In these embodiments, the amount of time the liquid line solenoid valve and/or hot gas solenoid valve is allowed to stay in an open state (dwell time), and how often the liquid line solenoid valve and/or hot gas solenoid valve is switched to an open state (frequency) can be adjusted by a TRS Controller of the TRS. A higher frequency can result in more stable TRS control, with nearly constant temperatures and pressures. A lower frequency can result in both temperature and pressure fluctuations.

In some embodiments, the duty cycle of the liquid line solenoid valve and/or hot gas solenoid valve is based on a temperature difference between set point temperature of the refrigerated transport unit and a measured internal space temperature within the refrigerated transport unit. In some embodiments, the TRS controller can increase the capacity and dwell time of the liquid line solenoid valve and/or hot gas solenoid valve when a temperature differential exists. The TRS Controller can decrease the dwell time of the liquid line solenoid valve and/or hot gas solenoid valve, as less capacity is needed, when a measured internal space temperature is close to set point.

An advantage of these embodiments is that the TRS can provide a more accurate temperature control of a refrigerated transport unit than a TRS that simply uses a thermal expansion device to provide temperature control.

Other features and aspects will become apparent by consideration of the following detailed description and accompanying drawings.

DETAILED DESCRIPTION

The embodiments described herein are directed to a TRS. More particularly, the embodiments relate to a system and method of temperature control for a TRS.

Figure 1:
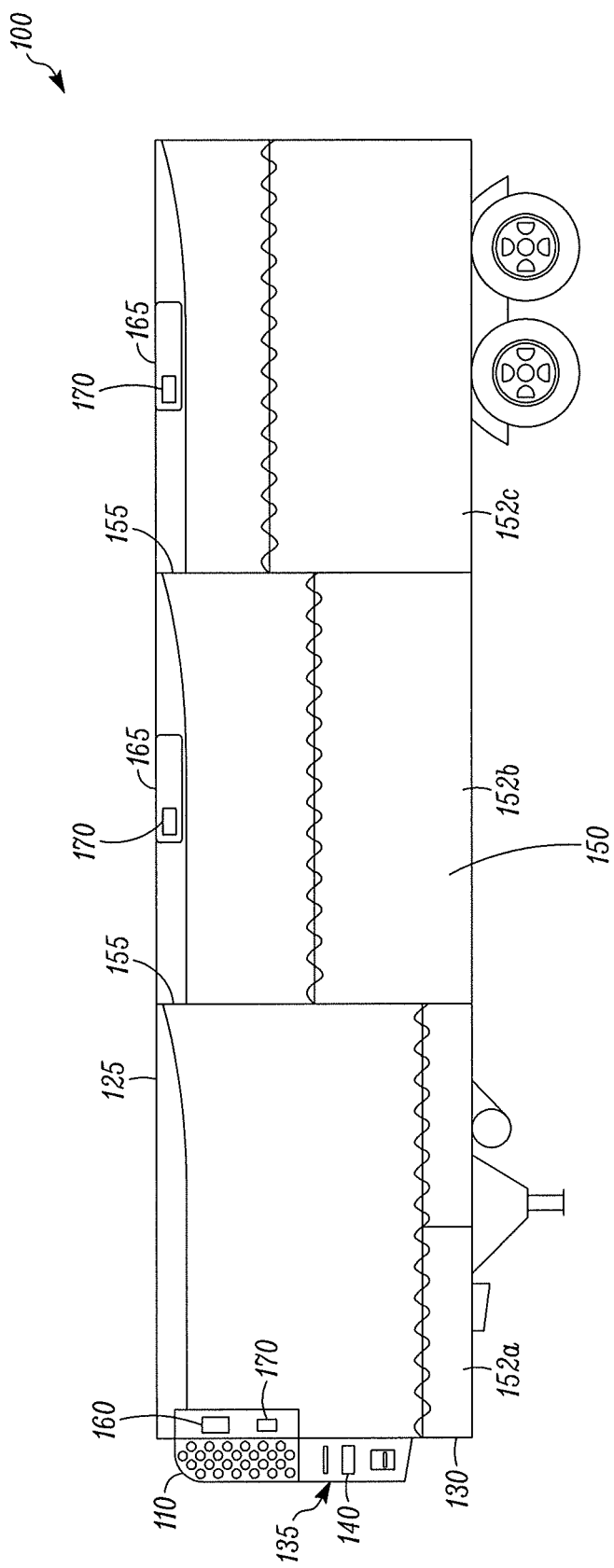
FIG. 1 illustrates a schematic cross sectional side view of a TRS, according to one embodiment.

FIG. 1 illustrates one embodiment of a TRS 100 for a refrigerated transport unit 125. The TRS 100 includes a TRU 110 that controls refrigeration within the refrigerated transport unit 125. The TRU 110 is disposed on a front wall 130 of the refrigerated transport unit 125. The refrigerated transport unit can be a truck or trailer unit that can be attached to a tractor, a ship board container, an air cargo container or cabin, an over the road truck cabin, etc. The TRU 110 includes a programmable TRS Controller 135 that may comprise a single integrated control unit 140 or that may comprise a distributed network of TRS control elements (not shown). The number of distributed control elements in a given network can depend upon the particular application of the principles described herein.

The refrigerated transport unit 125 includes an internal space 150 that can be divided into a plurality of zones 152 (a front zone 152a, a center zone 152b, and a rear zone 152c). The term "zone" means a portion of an area of the internal space 150. In some examples, each of the zones 152 can have a set point temperature that is the same or different from one another, and may be separated by a wall 155.

The TRS Controller 135 generally can include a processor (not shown), a memory (not shown), a clock (not shown) and an input/output (I/O) interface (not shown) and can be configured to receive data as input from various components within the TRS 100, and send command signals as output to various components within the TRS 100.

Generally, the TRS Controller 135 is configured to control a refrigeration cycle of the TRS 100. In one example, the TRS Controller 135 controls the refrigeration cycle of the TRS 100 to obtain various operating conditions (e.g., temperature, humidity, air quality etc.) of the internal space 150 as is generally understood in the art.

As shown in FIG. 1, an evaporator portion 160 of the TRU 110 is configured to provide cooling and/or heating/defrosting to the front zone 152a. The center zone 152b and the rear zone 152c each includes a remote evaporator unit 165 that is configured to provide cooling and/or heating/defrosting to the center zone 152b and the rear zone 152c, respectively. The remote evaporator units 165 are each fluidly connected to the TRU 110 and are part of a refrigeration circuit (not shown) that allows refrigerant to pass through the evaporator portion 160 and the remote evaporator units 165. The TRU 110 and each of the remote evaporator units 165 also include a zone temperature sensor 170 configured to measure temperature in the respective zone 152 in which the zone temperature sensor 170 is provided and send the measured zone temperature to the TRS Controller 135. In some embodiments, the zone temperature sensors 170 can be separate from the remote evaporator units. Also, in some embodiments, the zone temperature sensors 170 can be return air temperature sensors that are configured to measure a return air temperature of the evaporator units 165.

While the zones 152 in FIG. 1 are divided into substantially equal areas, it is to be realized that the internal space 150 may be divided into any number of zones and in any configuration that is suitable for refrigeration of the different zones.

The TRS Controller 135 is configured to control operation of the TRS 100, including a refrigeration circuit (e.g., the refrigeration circuit 200 shown in FIG. 2) of the TRS 100. This can include controlling operation of the refrigeration circuit such that each of the zones 152 reach and maintain the desired set point temperature. Operation of a TRS Controller, such as the TRS Controller 135, is discussed in more detail below.

Figure 2:
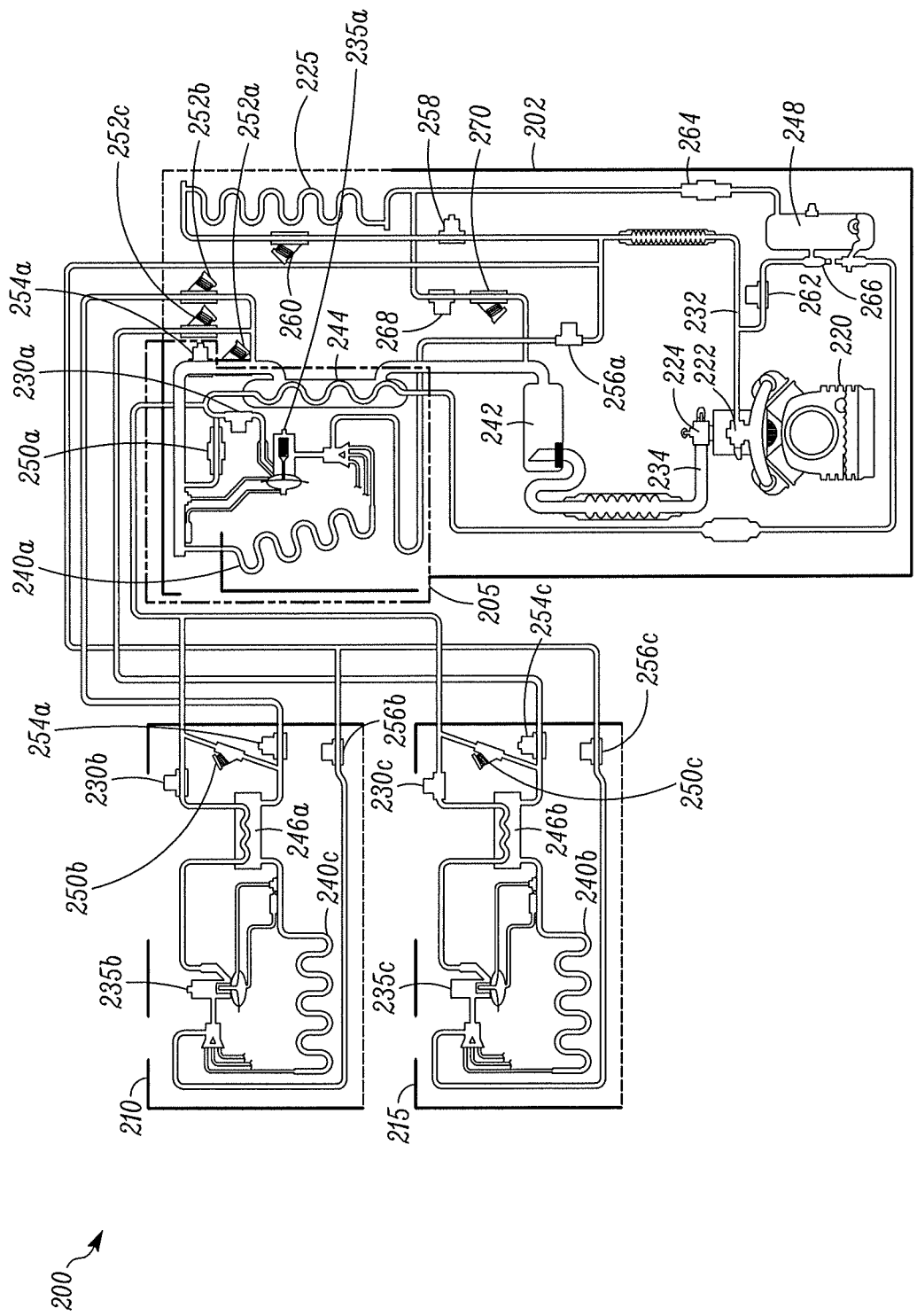
FIG. 2 illustrates a schematic refrigeration circuit diagram of a TRS that includes a TRU and two remote evaporator units, according to one embodiment.

FIG. 2 illustrates one embodiment of a refrigeration circuit 200 for a TRS of a three zone refrigerated transport unit, such as the TRS 110 shown in FIG. 1. The refrigeration circuit 200 includes a TRU portion 202, a center zone remote evaporator unit 210 and a rear zone remote evaporator unit 215.

The TRU portion 202 includes a compressor 220, a condenser coil 225 and a front zone evaporator unit 205. The compressor 220 includes a discharge port 222 for connecting the compressor 220 to a discharge line 232 and a suction port 224 for connecting the compressor 220 to a suction line 234. The compressor 220 is configured to compress refrigerant entering the suction port 224 via the suction line 234 and pass the compressed refrigerant to the discharge line 232 via the discharge port 222.

The condenser coil 225 is fluidly connected to the compressor 220 via the discharge line 232. The condenser coil 225 is configured to condense the compressed refrigerant from the compressor 220, thereby releasing latent heat of the refrigerant out of the TRU portion 202. The condensed refrigerant is then directed to the evaporator units 205, 210, 215.

Each of the evaporator units 205, 210, 215 includes a liquid line solenoid valve 230a-c, a thermal expansion device 235a-c, an evaporator coil 240a-c, and a hot gas solenoid valve 256a-c. The liquid line solenoid valves 230a-c are configured to control the amount of refrigerant that is introduced to the thermal expansion devices 235a-c and the evaporator coils 240a-c. The hot gas solenoid valves 256a-c are positioned upstream of the evaporator coils 240a-c and are configured to control the amount of hot gas introduced to the evaporator coils 240a-c. In some embodiments, a duty cycle of each of the liquid line solenoid valves 230a-c and the hot gas solenoid valves 256a-c is individually controlled by a TRS Controller (such as the TRS Controller 135 shown in FIG. 1).

Each of the liquid line solenoid valves 230a-c are individually controlled by the TRS Controller to vary the amount of refrigerant introduced to the respective thermal expansion device 235a-c and the respective evaporator coil 240a-c using a time based control. By controlling the amount of refrigerant flow introduced to each of the thermal expansion devices 235a-c and the evaporator coils 240a-c, the refrigeration circuit 200 can provide more accurate control the amount of cooling provided by each of the evaporator units 205, 210, 215.

Similarly, each of the hot gas solenoid valves 256a-c can also be individually controlled by the TRS Controller to vary the amount of hot gas introduced to the respective evaporator coils 240a-c using a time based control. By controlling the amount of hot gas introduced to each of the evaporator coils 240a-c, the TRS Controller can control the amount of heat allowed to enter the evaporator coils 240a-c. Thus, the refrigeration circuit 200 can provide more accurate control the amount of cooling provided by each of the evaporator units 205, 210, 215.

In some embodiments, the liquid line solenoid valves 230a-c and/or the hot gas solenoid valves 256a-c are high pulse count solenoid valves. As discussed herein, a high pulse count solenoid valve is configured to be able to pulse (e.g., rapidly enter an open state and a closed state) reliably over an extended period of time. For example, unlike a conventional solenoid valve, in some embodiments, when the high pulse count solenoid valve is operating under a 20 second time period, the high pulse count solenoid valve can reliably run about six million cycles over a ten year period.

An "open state" as discussed herein refers to a state where an orifice of the solenoid valve is nearly fully open (e.g., ~100% open). A "closed state" as discussed herein refers to a state where the orifice of the solenoid valve is nearly fully closed (e.g., ~0.1% open).

In some embodiments, the liquid line solenoid valves 230a-c and/or hot gas solenoid valves 256a-c are configured to be either in an open state or a closed state and have a fixed orifice. The amount of refrigerant passing through each liquid line solenoid valve 230a-c and/or the amount of hot gas passing through each hot gas solenoid valve 256a-c is varied by adaptively changing the amount of time the liquid line solenoid valve 230a-c and/or the hot gas solenoid valve 256a-c is allowed to stay in the open state. The amount of time each liquid line solenoid valve 230a-c and/or hot gas solenoid valve 256a-c is allowed to stay in the open state (dwell time), and how often the liquid line solenoid valve 230a-c and/or the hot gas solenoid valve 256a-c is operated in the open state (frequency) can be adjusted by a TRS Controller of the TRS. In some embodiments, the liquid line solenoid valves 230a-c and/or the hot gas solenoid valves 256a-c can be configured to have a variable orifice in which the size of the orifice can be controlled by the TRS Controller.

A higher frequency can result in more stable TRS control, with nearly constant temperatures and pressures. A lower frequency can result in both temperature and pressure fluctuations.

In some embodiments, the duty cycle of each liquid line solenoid valve 230a-c and/or hot gas solenoid valve 256a-c is based on a temperature difference between a set point temperature for a particular zone of the refrigerated transport unit and a measured return air temperature within the particular zone. In some embodiments, the TRS Controller can increase the capacity and dwell time of a particular liquid line solenoid valve 230a-c and/or hot gas solenoid valve 256a-c when a temperature differential exists between the set point temperature and the return air temperature of a particular zone. The TRS Controller can also decrease the dwell time of a particular liquid line solenoid valve 230a-c and/or hot gas solenoid valve 256a-c, as less capacity is needed, when the measured return air temperature is close to the set point temperature of the particular zone.

An advantage of these embodiments is that the TRS can provide a more accurate temperature control of a refrigerated transport unit than a TRS that simply uses a thermal expansion device to provide temperature control.

The thermal expansion devices 235a-c are metering devices that can also be configured to control the amount of refrigerant flow into the respective evaporator coil 240a-c. The thermal expansion devices 235a-c are configured to receive the condensed refrigerant from the condenser coil 225 and allow the condensed refrigerant to pass through to the evaporator coils 240a-c. In some embodiments, the thermal expansion devices 235a-c are configured to remain in a fully open state when the TRS Controller is operating the particular zone (e.g. zones 152 in FIG. 1) in which the thermal expansion device 235a-c is located in a cooling mode.

The evaporator coils 240a-c are configured to receive refrigerant from the corresponding thermal expansion device 235a-c, receive hot gas entering the evaporator units 205, 210, 215, and to transform the refrigerant from a liquid form into a gaseous form. By doing so, the refrigerant passing through the evaporator coils 240a-c can absorb heat from the surrounding area, thereby providing cooling to the surrounding area. Refrigerant passing through the evaporator coils 240a-c is then directed back to the compressor 220.

The refrigeration circuit 200 also includes an accumulator tank 242 positioned upstream of the compressor 220 and downstream of the liquid line solenoid valves 230a-c, a primary heat exchanger 244 positioned upstream of the accumulator tank 242 in the TRU portion 220, a secondary heat exchanger 246a-b provided in each of the evaporator units 210, 215, and a receiver tank 248 positioned in the TRU portion 202 downstream of the condenser coil 225.

Also, the refrigeration circuit 200 includes a number of valves and solenoids for controlling the flow of refrigerant. Each of the evaporator units 205, 210, 215 includes liquid return check valves 250a-c and suction line solenoid valves 254a-c. Also, the TRU portion 202 includes suction line check valves 252a-c for each of the evaporator units 205, 210 and 215, a condenser inlet solenoid 258, a condenser inlet check valve 260, a receiver tank pressure solenoid 262, a condenser check valve 264, a bypass hand valve 266, a purge valve 268 and a purge check valve 270.

Figure 3:
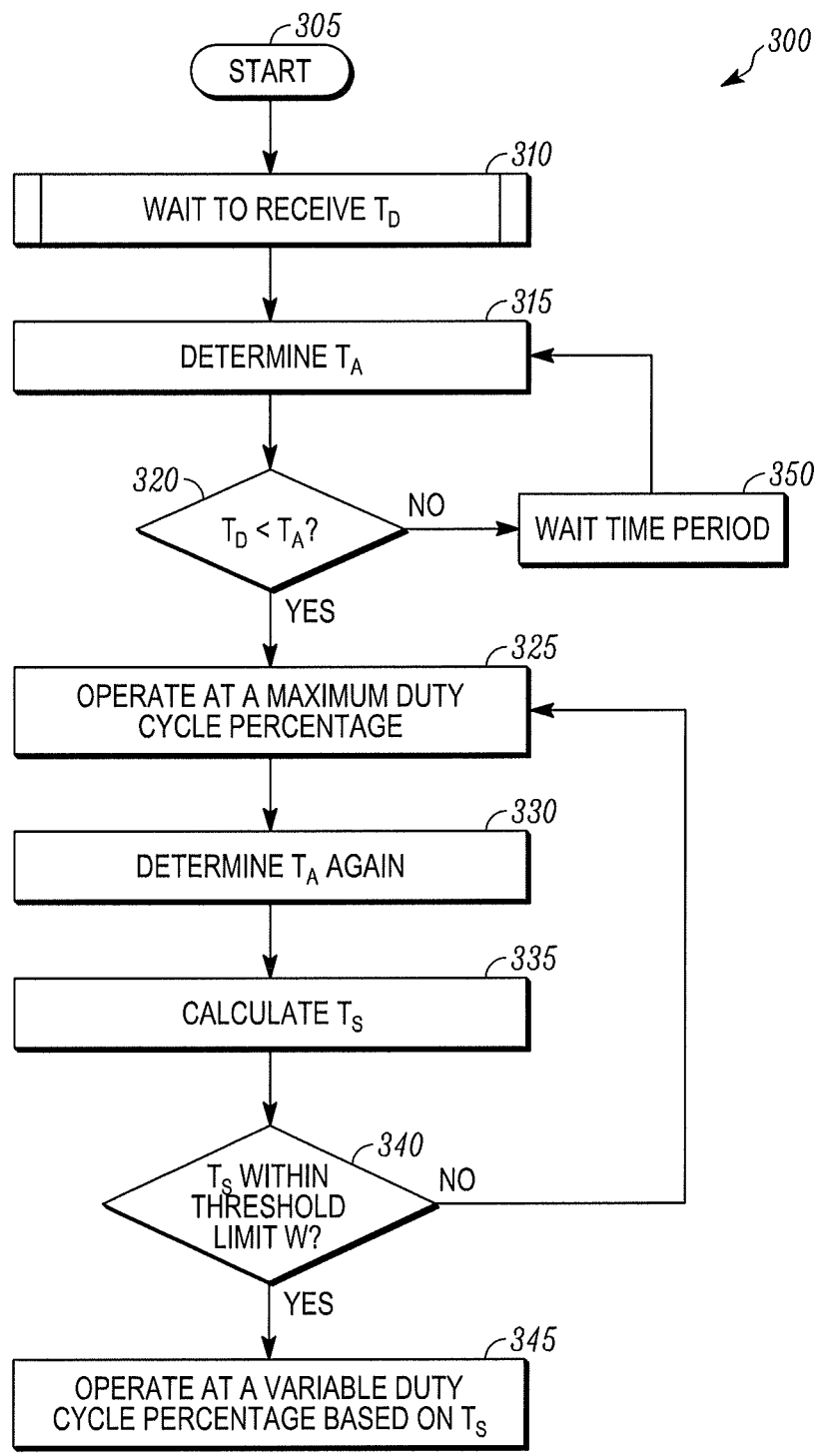
FIG. 3 illustrates a flow chart of a method of controlling temperature of a refrigerated transport unit, according to one embodiment.

FIG. 3 illustrates a flow chart of method 300 of temperature control of a TRS (e.g., the zones 152 of the TRS 100 shown in FIG. 1) using a liquid line solenoid valve and/or a hot gas solenoid valve. While the method 300 is discussed with respect to a refrigerated transport unit that includes only a single zone, it will be appreciated that the method 300 could also be used for temperature control of a particular zone of a refrigerated transport unit that includes multiple zones, as shown in FIG. 1. The method 300 starts at 305.

At 310, a TRS Controller (e.g., the TRS Controller 135 shown in FIG. 1) of the TRS waits to receive set point data that includes a desired set point temperature $T_D$ within an internal space (e.g., the internal space 130 shown in FIG. 1) of the refrigerated transport unit. In some embodiments, the set point data can be received from a user via a user interface of the TRS Controller. Once the TRS Controller receives the set point data the method 300 proceeds to 315.

At 315, the TRS Controller is configured to determine a measured internal space temperature $T_A$ within the internal space of the refrigerated transport unit. In some embodiments, the measured internal space temperature $T_A$ within the internal space can be determined using a return air temperature sensor that is configured to, for example measure a return air temperature of an evaporator (e.g., the zone temperature sensors 170 shown in FIG. 1).

At 320, the TRS Controller determines whether the desired set point temperature $T_D$ is less than the measured internal space temperature $T_A$. If the desired set point temperature $T_D$ is less than the measured internal space temperature $T_A$, the method 300 proceeds to 325. If the desired set point temperature $T_D$ is not less than the measured internal space temperature $T_A$, the method 300 proceeds to 350.

At 325, the TRS Controller instructs a liquid line solenoid valve (e.g., one of the liquid line solenoid valves 230*a*-*c* shown in FIG. 2) and/or a hot gas solenoid valve (e.g., one of the hot gas solenoid valves 256*a*-*c* shown in FIG. 2) to operate at a maximum duty cycle percentage over a time period X.

A duty cycle percentage, as discussed herein, refers to a percentage of time that a solenoid valve is operating in an open state over a time period M. For example, in some embodiments, the time period M can be about 20 seconds. In this example, the duty cycle percentage would refer to the percentage of those 20 seconds that the solenoid valve is operating in the open state.

Thus, in one embodiment, when the maximum duty cycle percentage of the liquid line solenoid valve and/or hot gas solenoid valve is set to ~100%, the TRS Controller instructs the liquid line solenoid valve and/or hot gas solenoid valve to operate in the open state for almost the entire duration of the time period X. Thus, when the time period X for the liquid line solenoid valve and/or the hot gas solenoid valve is set, for example, to ~20 seconds, the liquid line solenoid valve and/or the hot gas solenoid valve is configured to operate in the open state for ~20 seconds.

Accordingly, the amount of refrigerant and/or hot gas entering an evaporator unit/portion of the TRS is increased, thereby allowing a maximum amount of refrigerant and/or hot gas to pass through an evaporator unit/portion (e.g., the evaporator units 205, 210, 215) of the TRS and provide maximum cooling within the internal space of the refrigerated transport unit. The method 300 then proceeds to 330.

At 330, the TRS Controller is configured to again determine the measured internal space temperature $T_A$ within the internal space of the refrigerated transport unit. The method 300 then proceeds to 335.

At 335, the TRS Controller calculates a temperature difference $T_S$ between the desired set point temperature $T_D$ and the updated measured internal space temperature $T_A$.

At 340, the TRS Controller determines whether the temperature difference $T_S$ is within a threshold limit W. If the temperature difference $T_S$ is within the threshold limit W, the method 300 proceeds to 345. If the temperature difference $T_S$ is not within the threshold limit W, the method proceeds back to 325. For example, in one embodiment, the threshold limit W can be about 10° C. It will be appreciated that the threshold limit can be set based on the requirements of the TRS being used.

At 345, the TRS Controller operates the liquid line solenoid valve and/or hot gas solenoid valve at a variable duty cycle percentage based on the temperature difference $T_S$ between the desired set point temperature $T_D$ and the measured internal space temperature $T_A$. That is, as the measured internal space temperature $T_A$ is approaching the desired set point temperature $T_D$, the TRS Controller is configured to vary the duty cycle percentage so as to precisely and accurately approach the desired set point temperature $T_D$.

In some embodiments, the variable duty cycle percentage can be determined using a feedback loop, such as a proportional-integral-derivative (PID) feedback loop, a proportional-integral feedback loop, etc. In other embodiments, the variable duty cycle percentage can be determined using a look up table stored in a memory of the TRS Controller. An example of a method for determining a duty cycle percentage for a liquid line solenoid valve based on a temperature difference $T_S$ between a desired set point temperature $T_D$ and a measured internal space temperature $T_A$ of an internal space of a refrigerated transport unit is discussed below with respect to FIG. 4.

At 350, the TRS Controller waits for a predetermined time delay N. In some embodiments, the predetermined time delay N can be set to the time period X of the liquid line solenoid valve and/or the hot gas solenoid valve. For example, in one embodiment, the predetermined time delay N and the time period X of the liquid line solenoid valve and/or the hot gas solenoid valve can be about 20 seconds. The method 300 then proceeds back to 315.

Figure 4:
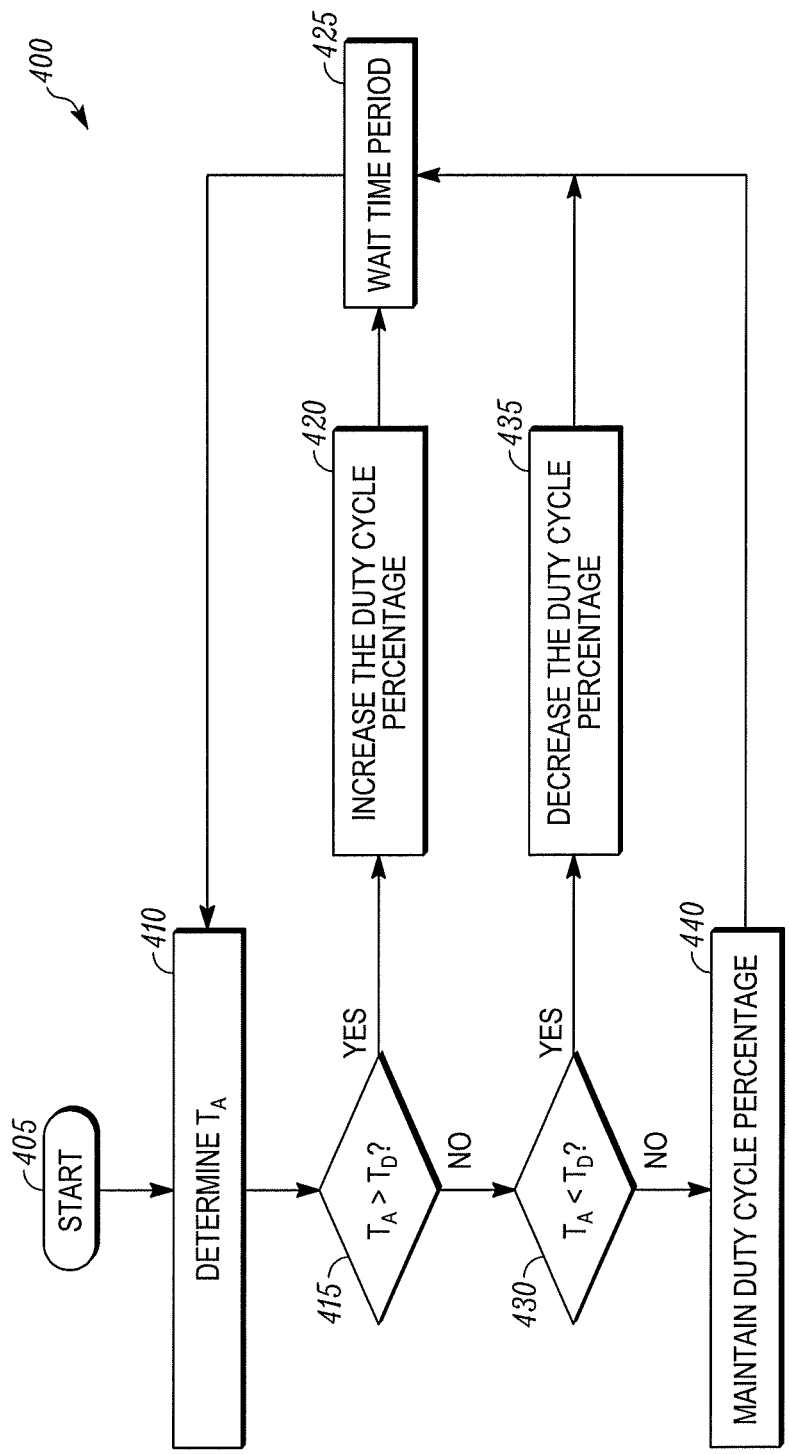
FIG. 4 illustrates a flow chart of a method of determining a duty cycle percentage for a liquid line solenoid valve and/or a hot gas solenoid valve based on a temperature difference between a desired set point temperature and a measured internal space temperature of an internal space of a refrigerated transport unit, according to one embodiment.

FIG. 4 illustrates a flow chart of a method 400 of determining a duty cycle percentage for a liquid line solenoid valve and/or a hot gas solenoid valve based on a temperature difference $T_S$ between a desired set point temperature $T_D$ and a measured internal space temperature $T_A$ of an internal space of a refrigerated transport unit, according to one embodiment. While the method 400 is discussed with respect to a refrigerated transport unit that includes only a single zone, it will be appreciated that the method 300 could also be used for temperature control of a particular zone of a refrigerated transport unit that includes multiple zones, as shown in FIG. 1. The method starts at 405.

At 410, a TRS Controller (e.g., the TRS Controller 135 shown in FIG. 1) determines a measured internal space temperature $T_A$ within the internal space of the refrigerated transport unit. In some embodiments, the measured internal space temperature $T_A$ within the internal space can be determined using a return air temperature sensor that is configured to, for example measure a return air temperature of an evaporator (e.g., the zone temperature sensors 170 shown in FIG. 1). The method 400 then proceeds to 415.

At 415, the TRS Controller determines if the measured internal space temperature $T_A$ is above a desired set point temperature $T_D$. If the measured internal space temperature $T_A$ is above the desired set point temperature $T_D$, the method 400 proceeds to 420. If the measured internal space temperature $T_A$ is not above the desired set point temperature $T_D$, the method 400 proceeds to 430.

At 420, the TRS Controller increases the duty cycle percentage by an amount that is proportional to a temperature difference $T_S$ between the desired set point temperature $T_D$ and the measured internal space temperature $T_A$. For example, in some embodiments, the TRS Controller can increase the duty cycle percentage by a first amount when the temperature difference $T_S$ is large and can increase the duty cycle percentage by a second amount that is smaller than the first amount when the temperature difference $T_S$ is small. Thus, the closer the measured internal space temperature approaches the desired set point temperature $T_D$, the smaller the increase in duty cycle percentage. The method 400 then proceeds to 425.

At 425, the TRS Controller waits for a predetermined time delay Y. In some embodiments, the predetermined time delay Y can be set to the time period X of the liquid line solenoid valve and/or the hot gas solenoid valve. For example, in one embodiment, the predetermined time delay Y and the time period X of the liquid line solenoid valve and/or the hot gas solenoid valve can be about 20 seconds. The method 400 then proceeds back to 410.

At 430, the TRS Controller determines if the measured internal space temperature $T_A$ is below a desired set point temperature $T_D$. If the measured internal space temperature $T_A$ is below the desired set point temperature $T_D$, the method 400 proceeds to 435. If the measured internal space temperature $T_A$ is not below the desired set point temperature $T_D$, the method 400 proceeds to 440.

At 435, the TRS Controller decreases the duty cycle percentage by an amount that is proportional to a temperature difference $T_S$ between the desired set point temperature $T_D$ and the measured internal space temperature $T_A$. For example, in some embodiments, the TRS Controller can decrease the duty cycle percentage by a first amount when the temperature difference $T_S$ is large and can decrease the duty cycle percentage by a second amount that is smaller than the first amount when the temperature difference $T_S$ is smaller. Thus, the closer the measured internal space temperature $T_A$ approaches the desired set point temperature $T_D$, the smaller the decrease in duty cycle percentage. The method 400 then proceeds to 425.

In some embodiments, when the TRS Controller is configured to set the duty cycle percentage of both a liquid line solenoid valve and a hot gas solenoid valve, the TRS Controller can set the duty cycle percentage such that the liquid line solenoid valve and the hot gas solenoid valve are alternately pulsing (e.g., rapidly entering an open state and a closed state).

In some embodiments, alternately pulsing the liquid line solenoid valve and the hot gas solenoid valve can include pulsing the liquid line solenoid valve while the hot gas solenoid valve remains in an open state for a period of time and then pulsing the hot gas solenoid valve while the liquid line solenoid valve remains in an open state for a period of time. In other embodiments, alternately pulsing the liquid line solenoid valve and the hot gas solenoid valve can include operating the liquid line solenoid valve in an open state while the hot gas solenoid valve is in a closed state and operating the hot gas solenoid valve in an open state while the liquid line solenoid valve is in a closed state.

At 440, the TRS Controller determines that the measured internal space temperature $T_A$ is approximately the desired set point temperature $T_D$. Accordingly, the TRS Controller is configured to maintain the duty cycle percentage at its current percentage. The method 400 then proceeds to 425.

Figure 5:
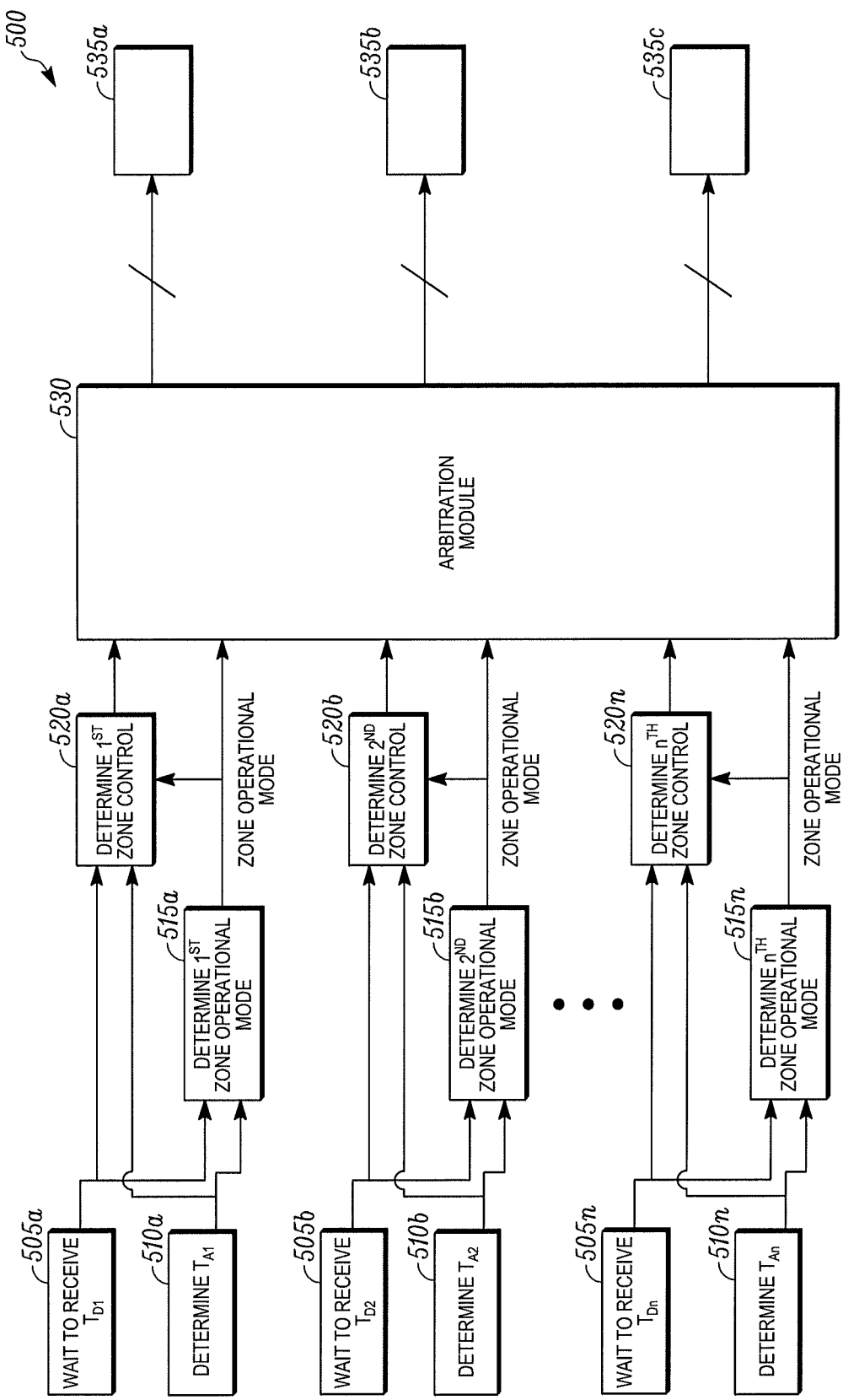
FIG. 5 illustrates a schematic diagram of a method for controlling a multi-temperature TRS, according to one embodiment.

FIG. 5 illustrates a schematic diagram of one embodiment of a method 500 for controlling a multi-temperature TRS (e.g., the TRS 100 shown in FIG. 1). The method 500 can allow the TRS to provide temperature control for each of a plurality of zones (e.g., the zones 152 shown in FIG. 1) of an internal space (e.g., the internal space 150 shown in FIG. 1). When the TRS is in operation, the method 500 also can ensure that at least one of the liquid line solenoid valves (e.g., the liquid line solenoid valves 230a-c shown in FIG. 2) and the hot gas solenoid valve (e.g., the hot gas solenoid valves 256a-c shown in FIG. 2) for the respective zone is at least partially open at all times. By ensuring that all of the liquid line solenoid valves and all of the hot gas solenoid valves are not closed at the same time, refrigerant can flow through a refrigeration circuit (e.g., the refrigeration circuit 200 shown in FIG. 2) of the TRS. While the method 500 is discussed with respect to temperature control, the multi-temperature TRS can also be configured to obtain other operating conditions (e.g., humidity, air quality, etc.) for each of the plurality of zones of the internal space.

At 505a-n, a TRS Controller (e.g., the TRS Controller 135 shown in FIG. 1) of the TRS waits to receive set point data that includes a desired set point temperature $T_{D1-n}$ for each of the zones. At 510a-n, the TRS controller is configured to determine a measured internal space temperature $T_{A1-n}$ for each of the zones within the internal space. In some embodiments, the measured internal space temperature $T_{A1-n}$ within the internal space can be determined using a return air temperature sensor that is configured to, for example measure a return air temperature of an evaporator (e.g., the zone temperature sensors 170 shown in FIG. 1).

At 515a-n, the TRS Controller determines an operation mode instruction to operate the refrigeration circuit for each of the zones based on the received desired set point temperature $T_{D1-n}$ for each zone and the determined internal space temperature $T_{A1-n}$ for each zone. For example, in one embodiment, the TRS Controller can determine an operation mode of a first zone using the desired set point temperature $T_{D1}$ and the determined internal space temperature for the first zone $T_{A1}$. Similarly, the TRS Controller can determine the operation mode for the second zone using the desired set point temperature $T_{D2}$ and the determined internal space temperature for the second zone $T_{A2}$, and the operation mode for the nth zone using the desired set point temperature $T_{Dn}$ and the determined internal space temperature for the nth zone $T_{An}$.

In one embodiment, the TRS Controller can operate the refrigeration circuit for a particular zone in a cooling mode, a null mode, a heating mode, etc. In the cooling mode, the TRS Controller can control the refrigeration circuit to provide cooling for the particular zone when the desired set point temperature is lower than the determined internal space temperature for the particular zone. In the heating mode, the TRS Controller can control the refrigeration circuit to provide heating for the particular zone when the desired set point temperature is higher than the determined internal space temperature for the particular zone. In some embodiments of the heating mode, the liquid line solenoid valves and the hot gas solenoid valves are prevented from pulsing. In the null mode, the TRS Controller can control the refrigeration circuit to provide no heating or cooling or at least limited heating or cooling for the particular zone when the desired set point temperature is determined to be close (e.g., within a few degrees ° F.) to the determined internal space temperature for the particular zone.

At 515a-n, the TRS Controller uses the determined operation mode instruction at the respective 520a-n and at an arbitration module 530.

At 520a-n, the TRS Controller determines a duty cycle of the respective liquid line solenoid valve and/or hot gas solenoid valve based off of the operation mode instruction signal, the received desired set point temperature $T_{D1-n}$, and the determined internal space temperature $T_{A1-n}$ for the respective zone. The duty cycle determined at 515a-n is then used by the TRS Controller at the arbitration module 530.

At 530, the TRS Controller arbitrates the operation of the refrigeration circuit for each of the zones based on the operation mode instruction for each of the zones determined at 515a-n and the duty cycle determined at 520a-n. In one embodiment, the TRS Controller can be configured to arbitrate operation between each of the zones such that at least one of the liquid line solenoid valves and the respective hot gas solenoid valve for a respective zone is at least partially open at all times during operation of the TRS. By ensuring that all of the liquid line solenoid valves and all of the hot gas solenoid valves are not closed at the same time, refrigerant can flow through a refrigeration circuit (e.g., the refrigeration circuit 200 shown in FIG. 2) of the TRS.

The TRS Controller can also be configured to arbitrate the operation of the refrigeration circuit such that each of the zones is operating within a predetermined range of the desired operating conditions. For example, in some embodiments, each of the zones may require that a different desired set point temperature. In this scenario, the TRS Controller can control operation of the refrigeration circuit to ensure that each of the zones can efficiently and quickly reach the desired set point temperature.

Further, the TRS Controller can be configured to arbitrate the operation of the refrigeration circuit such that the duty cycle of the liquid line solenoid valve and/or the hot gas solenoid valve for a respective zone is set to ensure that all of the liquid line solenoid valves and all of the hot gas solenoid valves are not closed at the same time and such that the desired operating conditions for each zone is reached quickly and efficiently.

At 535*a-n*, the TRS Controller provides instructions to various components of the refrigeration circuit (e.g., a compressor 220, one or more liquid line solenoid valves, one or more hot gas solenoid valves, one or more evaporator fans, one or more condenser fans, etc.) based on the arbitration of the operating mode instructions and the duty cycles for each of the respective zones.

Figure 6:
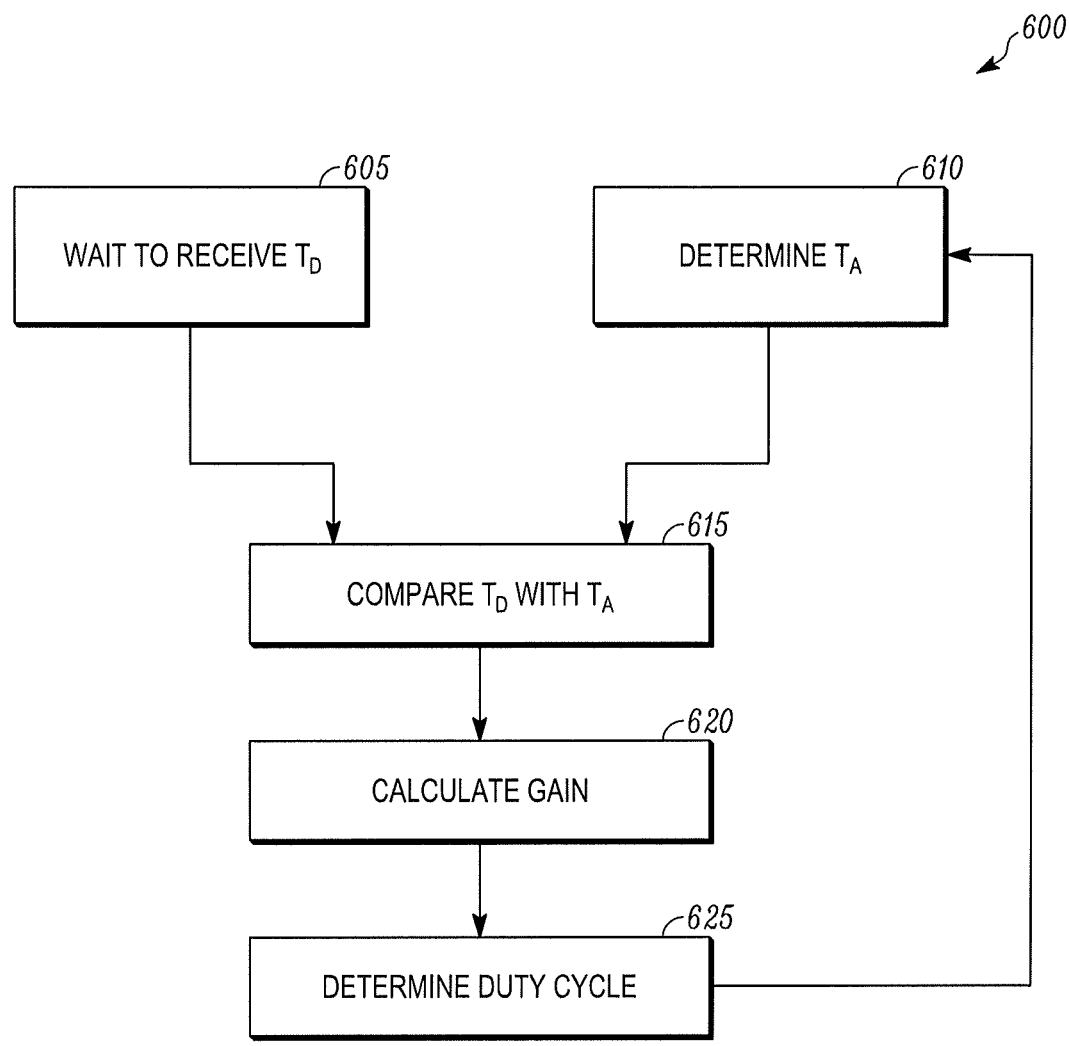
FIG. 6 illustrates a schematic diagram for a duty cycle for a solenoid valve in a TRS, according to one embodiment.

FIG. 6 illustrates a schematic diagram of a method 600 for determining a duty cycle for a liquid line solenoid valve (e.g., the liquid line solenoid valves 230*a-c* shown in FIG. 2) or a hot gas solenoid valve (e.g., the hot gas solenoid valve valves 256*a-c* shown in FIG. 2) in a TRS (e.g., the TRS 100 shown in FIG. 1), according to one embodiment. It will be appreciated that in some embodiments a relationship between a duty cycle of the solenoid valve and a mass-flow of the refrigeration circuit can be non-linear. In particular, in some embodiments, as the duty cycle of a solenoid valve increases, the mass-flow of the refrigeration circuit can increase following a square root curve. The method 600 can compensate for this by allowing a gain calculation for determining the duty cycle to change dynamically based upon a previous duty cycle. The method 600 starts at 605.

At 605, a TRS Controller (e.g., the TRS Controller 135 shown in FIG. 1) of the TRS waits to receive set point data that includes a desired set point temperature $T_D$ within an internal space (e.g., the internal space 130 shown in FIG. 1) of the refrigerated transport unit. In some embodiments, the set point data can be received from a user via a user interface of the TRS Controller. Once the TRS Controller receives the set point data the method 600 proceeds to 610.

At 610, the TRS Controller is configured to determine a measured internal space temperature $T_A$ within the internal space of the refrigerated transport unit. In some embodiments, the measured internal space temperature $T_A$ within the internal space can be determined using a return air temperature sensor that is configured to, for example measure a return air temperature of an evaporator (e.g., the zone temperature sensors 170 shown in FIG. 1).

At 615, the TRS Controller compares the desired set point temperature $T_D$ with the measured internal space temperature $T_A$. Based on the comparison the TRS Controller can determine a preliminary duty cycle for the solenoid valve.

At 620, the TRS Controller calculates a gain to be applied for determining the duty cycle based off of the preliminary duty cycle determined at 615 and a previous duty cycle of the solenoid valve immediately prior to 610.

At 625 the TRS Controller determines the new duty cycle to be used for the solenoid valve by adjusting the preliminary duty cycle determined at 615 with the gain calculated at 620. The method 600 also replaces the value used as the previous duty cycle of the duty cycle with the value of the new duty cycle and the method 600 proceeds back to 610. Accordingly, a non-linear relationship between the duty cycle and the mass-flow of the refrigeration circuit can be compensated for when determining the duty cycle.

An advantage of these embodiments is that more stable temperature control of the TRS can be achieved. In particular, these embodiments can allow the TRS to provide a more accurate temperature control of a refrigerated transport unit than a TRS that simply uses a thermal expansion device to provide temperature control. In fact it has been found, that the embodiments discussed herein can maintain a temperature within the refrigerated transport unit with over five times the precision than a TRS that achieves temperature control using a thermal expansion device alone.

Aspects:

Any of aspects 1-15 can be combined with any of aspects 16-41. Any aspects 16-31 can be combined with any of aspects 32-41.

Aspect 1. A method for temperature control of an internal space of a refrigerated transport unit using a transport refrigeration system (TRS) that includes a refrigeration circuit having a compressor, a condenser, a thermal expansion device, an evaporator and a solenoid valve, the method comprising:

determining a measured internal space temperature within the internal space of the refrigerated transport unit;

calculating, via a TRS controller, a temperature difference between the measured internal space temperature and a desired set point temperature; and adjusting, via the TRS controller, a duty cycle percentage of the solenoid valve based on the temperature difference to provide temperature control within an internal space of the refrigerated transport unit.

Aspect 2. The method of aspect 1, wherein adjusting, via the TRS controller, the duty cycle percentage of the solenoid valve based on the temperature difference to provide temperature control within an internal space of the refrigerated transport unit includes:

increasing the duty cycle percentage when the measured internal space temperature is greater than the desired set point temperature;

decreasing the duty cycle percentage when the measured internal space temperature is less than the desired set point temperature; and maintaining the duty cycle percentage when the measured internal space temperature is about equal to the desired set point temperature.

Aspect 3. The method of any of aspects 1-2, further comprising:

determining whether the temperature difference is within a threshold limit;

operating the solenoid valve at a maximum duty cycle percentage when the temperature difference is outside the threshold limit; and operating the solenoid valve at the duty cycle percentage based on the temperature difference when the temperature difference is within the threshold limit.

Aspect 4. The method of aspect 3, wherein the maximum duty cycle percentage is one hundred percent.

Aspect 5. The method of any of aspects 3-4, wherein the threshold limit is ten degrees.

Aspect 6. The method of any of aspects 1-5, further comprising:

determining whether the desired set point temperature is less than the measured internal space temperature; and waiting a time period when the desired set point temperature is not less than the measured internal space temperature.

Aspect 7. The method of aspect 6, wherein the time period is twenty seconds.

Aspect 8. The method of any of aspects 1-7, wherein the solenoid valve is a high pulse count solenoid valve.

Aspect 9. The method of any of aspects 1-8, wherein the solenoid valve is a liquid line solenoid valve positioned upstream of the thermal expansion device and the evaporator, and wherein adjusting, via the TRS controller, the duty cycle percentage of the solenoid valve based on the temperature difference to provide temperature control within the internal space of the refrigerated transport unit includes adjusting, via the TRS controller, a duty cycle percentage of the liquid line solenoid valve based on the temperature difference to control an amount of refrigerant directed to the thermal expansion device and the evaporator.

Aspect 10. The method of any of aspects 1-9, further comprising: adjusting, via the TRS controller, a hot gas solenoid valve duty cycle percentage of a hot gas solenoid valve based on the temperature difference to control an amount of hot gas directed to the evaporator.

Aspect 11. The method of aspect 10, wherein adjusting the duty cycle percentage of the liquid line solenoid valve and adjusting the duty cycle percentage of the hot gas solenoid valve includes alternately pulsing the liquid line solenoid valve and the hot gas solenoid valve.

Aspect 12. The method of any of aspects 10-11, wherein the hot gas solenoid valve is a high pulse count solenoid valve.

Aspect 13. The method of any of aspects 1-8, wherein the solenoid valve is a hot gas solenoid valve, and wherein adjusting, via the TRS controller, the duty cycle percentage of the solenoid valve based on the temperature difference to provide temperature control within the internal space of the refrigerated transport unit includes adjusting, via the TRS controller, a duty cycle percentage of the hot gas solenoid valve based on the temperature difference to control an amount of hot gas directed to the evaporator.

Aspect 14. The method of any of aspects 1-13, wherein the evaporator providing temperature control within a first zone of the internal space, and wherein the TRS includes an evaporator unit including a second thermal expansion device, a second evaporator and a second solenoid valve and providing temperature control within a second zone of the internal space, and the method further including:
determining a measured second zone internal space temperature within the second zone of the internal space;
calculating, via the TRS controller, a second temperature difference between the measured second zone internal space temperature and a desired second zone set point temperature; and
adjusting, via the TRS controller, a second duty cycle percentage of the second solenoid valve based on the second temperature difference to provide temperature control within the second zone of the internal space.

Aspect 15. The method of any of aspects 1-14, further comprising:
calculating a duty cycle gain of the solenoid valve based on a previous duty cycle percentage; and
adjusting, via the TRS controller, the duty cycle percentage of the solenoid valve based on the temperature difference and the duty cycle gain to provide temperature control within the internal space of the refrigerated transport unit.

Aspect 16. A transport refrigeration system (TRS) for a refrigerated transport unit, comprising:

a refrigeration circuit including a compressor, a condenser, an evaporator, and a thermal expansion device;
the refrigeration circuit also including a solenoid valve, the solenoid valve operating under a duty cycle percentage and configured to provide temperature control within an internal space of the refrigerated transport unit based on the duty cycle percentage;
a TRS controller configured to adjust the duty cycle percentage of the solenoid valve based on a temperature difference between a desired set point temperature of an internal space of the refrigerated transport unit and a measured internal space temperature of the internal space.

Aspect 17. The TRS of aspect 16, wherein the TRS controller is configured to increase the duty cycle percentage when the measured internal space temperature is greater than the desired set point temperature, decrease the duty cycle percentage when the measured internal space temperature is less than the desired set point temperature, and maintain the duty cycle percentage when the measured internal space temperature is about equal to the desired set point temperature.

Aspect 18. The TRS of any of aspects 16-17, wherein the TRS controller is configured to determine whether the temperature difference is within a threshold limit, operate the solenoid valve at a maximum duty cycle percentage when the temperature difference is outside the threshold limit, operate the liquid line solenoid valve at the duty cycle percentage based on the temperature difference when the temperature difference is within the threshold limit.

Aspect 19. The TRS of aspect 18, wherein the maximum duty cycle percentage is one hundred percent.

Aspect 20. The TRS of any of aspects 18-19, wherein the threshold limit is ten degrees.

Aspect 21. The TRS of any of aspects 16-20, wherein the TRS controller is configured to determine whether the desired set point temperature is less than the measured internal space temperature, and wait a time period when the desired set point temperature is not less than the measured internal space temperature.

Aspect 22. The TRS of aspect 21, wherein the time period is twenty seconds.

Aspect 23. The TRS of any of aspects 16-22, wherein the liquid line solenoid valve is a high pulse count solenoid valve.

Aspect 24. The TRS of any of aspects 16-23, wherein the solenoid valve is a liquid line solenoid valve positioned upstream of the thermal expansion device and the evaporator, the liquid line solenoid valve operating under the duty cycle percentage and configured to control an amount of refrigerant directed to the thermal expansion device and the evaporator based on the duty cycle percentage.

Aspect 25. The TRS of aspect 24, wherein the refrigeration circuit includes a hot gas solenoid valve, the hot gas solenoid valve operating under a hot gas solenoid valve duty cycle percentage and configured to control an amount of hot gas entering the evaporator based on the hot gas solenoid valve duty cycle percentage, and wherein the TRS controller is configured to adjust the hot gas solenoid valve duty cycle percentage based on the temperature difference between the desired set point temperature of the internal space of the refrigerated transport unit and the measured internal space temperature of the internal space.

Aspect 26. The TRS of aspect 25, wherein the TRS controller is configured to adjust the duty cycle percentage of the liquid line solenoid valve and adjust the hot gas solenoid valve duty cycle percentage of the hot gas solenoid valve to alternately pulse the liquid line solenoid valve and the hot gas solenoid valve.

Aspect 27. The TRS of any of aspects 25-26, wherein the hot gas solenoid valve is a high pulse count solenoid valve.

Aspect 28. The TRS of any of aspects 16-23, wherein the solenoid valve is a hot gas solenoid valve, the hot gas solenoid valve operating under the duty cycle percentage and configured to control an amount of hot gas entering the evaporator based on the duty cycle percentage.

Aspect 29. The TRS of aspect 28, wherein the hot gas solenoid valve is a high pulse count solenoid valve.

Aspect 30. The TRS of any of aspects 16-29, wherein the evaporator is configured to provide temperature control within a first zone of the internal space, and the TRS further including an evaporator unit configured to provide temperature control within a second zone of the internal space, the evaporator unit including a second thermal expansion device, a second evaporator and a second solenoid valve, the second solenoid valve operating under a second duty cycle percentage and configured to provide temperature control within the second zone of the internal space based on the second duty cycle percentage, wherein the TRS controller is configured to adjust the second duty cycle percentage of the second solenoid valve based on a second temperature difference between a desired set point temperature of the second zone and a second measured internal space temperature of the second zone.

Aspect 31. The TRS of any of aspects 16-30, wherein the TRS controller is configured to calculate a duty cycle gain of the solenoid valve based on a previous duty cycle percentage; and the TRS controller is configured to adjust the duty cycle percentage of the solenoid valve based on the temperature difference and the duty cycle gain to provide temperature control within the internal space of the refrigerated transport unit.

Aspect 32. A multi-temperature transport refrigeration system (TRS) for a refrigerated transport unit, comprising:

an internal space including a first zone and a second zone;

a refrigeration circuit including a compressor, a condenser, an evaporator for providing temperature control within the first zone, and an evaporator unit for providing temperature control within the second zone;

the refrigeration circuit also including a first solenoid valve configured to operate under a first duty cycle percentage and configured to provide temperature control within the first zone based on the first duty cycle percentage, and a second solenoid valve configured to operate under a second duty cycle percentage and configured to provide temperature control within the second zone based on the second duty cycle percentage;

a TRS controller configured to adjust the first duty cycle percentage based on a first temperature difference between a desired set point temperature within the first zone and a measured temperature of the first zone, and configured to adjust the second duty cycle percentage based on a second temperature difference between a desired set point temperature within the second zone and a measured temperature of the second zone.

Aspect 33. The multi-temperature TRS of aspect 32, wherein the TRS controller is configured to, during operation, prevent the first solenoid valve and the second solenoid valve from operating in a closed position at the same time.

Aspect 34. The multi-temperature TRS of any of aspects 32-33, wherein the TRS controller is configured to arbitrate pulsing of the first solenoid valve and the second solenoid valve.

Aspect 35. The multi-temperature TRS of any of aspects 32-34, wherein the TRS controller is configured to determine a first zone operation mode for providing temperature control within the first zone based the first temperature difference, and configured to determine a second zone operation mode for providing temperature control within the second zone based the second temperature difference.

Aspect 36. The multi-temperature TRS of aspect 35, wherein the TRS controller is configured to adjust the first duty cycle percentage based on the first temperature difference and the first zone operation mode, and configured to adjust the second duty cycle percentage based on the second temperature difference and the second zone operation mode.

Aspect 37. The multi-temperature TRS of aspect 36, wherein the TRS controller is configured to arbitrate pulsing of the first solenoid valve and the second solenoid valve based on the first zone operation mode and the second operation mode.

Aspect 38. The multi-temperature TRS of aspect 37, wherein the TRS controller is configured to arbitrate pulsing of the first solenoid valve and the second solenoid valve based on the first duty cycle percentage and the second duty cycle percentage.

Aspect 39. The multi-temperature TRS of any of aspects 32-38, wherein the TRS controller is configured to calculate a first duty cycle gain of the first solenoid valve based on a previous first solenoid valve duty cycle percentage, and is configured to calculate a second duty cycle gain of the second solenoid valve based on a previous second solenoid valve duty cycle percentage; and wherein the TRS controller configured to adjust the first duty cycle percentage based on the first temperature difference and the first duty cycle gain, and configured to adjust the second duty cycle percentage based on the second temperature difference and the second duty cycle gain.

Aspect 40. The multi-temperature TRS of any of aspects 32-39, wherein the first solenoid valve is at least one of a first liquid line solenoid valve and a first hot gas solenoid valve, and the second solenoid valve is at least one of a second liquid line solenoid valve and a second hot gas solenoid valve.

Aspect 41. The multi-temperature TRS of any of aspects 32-40, wherein the first and second solenoid valves are high pulse count solenoid valves.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A transport refrigeration system (TRS) for a refrigerated transport unit, comprising:
   a refrigeration circuit including a compressor, a condenser, an evaporator, and a thermal expansion device;
   the refrigeration circuit also including a solenoid valve, the solenoid valve operating under a duty cycle percentage and configured to provide temperature control within an internal space of the refrigerated transport unit based on the duty cycle percentage;

a TRS controller configured to:
calculate a temperature difference between a measured internal space temperature and a desired set point temperature,
determine whether the calculated temperature difference is within a threshold limit;
operate the solenoid valve at a set duty cycle percentage when the calculated temperature difference is outside of the threshold limit, wherein the set duty cycle percentage is a non-zero amount of time that the solenoid valve is operated in an open state over a time period of the duty cycle;
operate the solenoid valve at a variable duty cycle percentage that is based on the calculated temperature difference to provide temperature control within the internal space of the refrigerated transport unit when the calculated temperature difference is within the threshold limit;
wherein the TRS controller is configured to operate the solenoid valve at the variable duty cycle percentage of the solenoid valve includes the TRS controller being configured to:
calculate a duty cycle gain of the solenoid valve based on a previous duty cycle percentage to compensate for a non-linear relationship between the duty cycle percentage and a mass-flow of the refrigeration circuit, and
adjust the duty cycle percentage of the solenoid valve in a manner that compensates for the non-linear relationship between the variable duty cycle percentage and the mass-flow of the refrigeration circuit based on the calculated temperature difference and the calculated duty cycle gain of the solenoid valve to provide temperature control within the internal space of the refrigerated transport unit.

2. The TRS of claim 1, wherein the solenoid valve is a liquid line solenoid valve positioned upstream of the thermal expansion device and the evaporator, the liquid line solenoid valve operating under the duty cycle percentage and configured to control an amount of refrigerant directed to the thermal expansion device and the evaporator based on the duty cycle percentage.

3. The TRS of claim 2, wherein the refrigeration circuit includes a hot gas solenoid valve, the hot gas solenoid valve operating under a hot gas solenoid valve duty cycle percentage and configured to control an amount of hot gas entering the evaporator based on the hot gas solenoid valve duty cycle percentage,
wherein the TRS controller is configured to adjust the hot gas solenoid valve duty cycle percentage based on the temperature difference and the calculated duty cycle gain of the solenoid valve, and
wherein the TRS controller is configured to adjust the duty cycle percentage of the liquid line solenoid valve and adjust the hot gas solenoid valve duty cycle percentage of the hot gas solenoid valve to alternately pulse the liquid line solenoid valve and the hot gas solenoid valve as the measured internal temperature is dropping towards the desired set point temperature.

4. The TRS of claim 3, wherein the liquid line solenoid valve is a high pulse count solenoid valve, and
wherein the hot gas solenoid valve is a high pulse count solenoid valve.

5. The TRS of claim 1, wherein the solenoid valve is a hot gas solenoid valve, the hot gas solenoid valve operating under the duty cycle percentage and configured to control an amount of hot gas entering the evaporator based on the duty cycle percentage, and
wherein the hot gas solenoid valve is a high pulse count solenoid valve.

6. The TRS of claim 3, wherein to alternately pulse the liquid line solenoid valve and the hot gas solenoid valve until the desired set point temperature is reached, the TRS controller is configured to pulse the liquid line solenoid valve while the hot gas solenoid valve remains in an open state for a period of time and then pulse the liquid line solenoid valve while the liquid line solenoid valve remains in an open state for a second period of time.

7. The TRS of claim 1, wherein the TRS controller is configured to calculate the duty cycle gain of the solenoid valve based on the previous duty cycle percentage to compensate for the non-linear relationship between the duty cycle percentage and the mass-flow of the refrigeration circuit includes the TRS controller being configured to:
compare the measured internal space temperature with the desired set point temperature,
determine a preliminary duty cycle percentage for the solenoid valve based on the comparison between the measured internal space temperature with the desired set point temperature, and
calculate a duty cycle gain of the solenoid valve based on the preliminary duty cycle percentage and a previous duty cycle percentage to compensate for the non-linear relationship between the duty cycle percentage and the mass-flow of the refrigeration circuit; and
wherein the TRS controller is configured to adjust the duty cycle percentage of the solenoid valve in a manner that compensates for the non-linear relationship between the variable duty cycle percentage and the mass-flow of the refrigeration circuit based on the calculated temperature difference and the calculated duty cycle gain of the solenoid valve to provide temperature control within the internal space of the refrigerated transport unit includes the TRS controller being configured to adjust the preliminary duty cycle percentage-of the solenoid valve based on the duty cycle gain.

8. The TRS of claim 1, wherein the set duty cycle percentage is a maximum duty cycle percentage that the solenoid valve can operate in the open state during the time period of the duty cycle.

9. A method for temperature control of an internal space of a refrigerated transport unit using a transport refrigeration system (TRS) that includes a refrigeration circuit having a compressor, a condenser, a thermal expansion device, an evaporator and a solenoid valve, the method comprising:
determining a measured internal space temperature within the internal space of the refrigerated transport unit;
calculating, via a TRS controller, a temperature difference between the measured internal space temperature and a desired set point temperature;
operating the solenoid valve, which is positioned downstream of a discharge port of the compressor and upstream of a suction port of the compressor, at a variable duty cycle percentage that is based on the calculated temperature difference to provide temperature control within the internal space of the refrigerated transport unit, wherein operating the solenoid valve at the variable duty cycle percentage of the solenoid valve includes:
calculating a duty cycle gain of the solenoid valve based on a previous duty cycle percentage to compensate for a non-linear relationship between the variable duty cycle percentage and a mass-flow of the refrigeration circuit, and adjusting, via the TRS controller, the variable duty cycle percentage of the solenoid valve in a manner that compensates for the non-linear relationship between the variable duty cycle percentage and the mass-flow of the refrigeration circuit based on the calculated temperature difference and the calculated duty cycle gain of the solenoid valve to provide temperature control within the internal space of the refrigerated transport unit.

10. The method of claim 9, wherein the solenoid valve is a liquid line solenoid valve positioned upstream of the thermal expansion device and the evaporator, and wherein adjusting, via the TRS controller, the variable duty cycle percentage of the solenoid valve in a manner that compensates for the non-linear relationship between the variable duty cycle percentage and the mass-flow of the refrigeration circuit based on the temperature difference and the calculated duty cycle gain of the solenoid valve to provide temperature control within the internal space of the refrigerated transport unit includes adjusting, via the TRS controller, a duty cycle percentage of the liquid line solenoid valve based on the temperature difference and the calculated duty cycle gain to control an amount of refrigerant directed to the thermal expansion device and the evaporator.

11. The method of claim 10, further comprising: adjusting, via the TRS controller, a hot gas solenoid valve duty cycle percentage of a hot gas solenoid valve based on the temperature difference and the calculated duty cycle gain to control an amount of hot gas directed to the evaporator, and wherein adjusting the duty cycle percentage of the liquid line solenoid valve and adjusting the duty cycle percentage of the hot gas solenoid valve includes alternately pulsing the liquid line solenoid valve and the hot gas solenoid valve as the measured internal temperature is dropping towards the desired set point temperature.

12. The method of claim 10, wherein the liquid line solenoid valve is a high pulse count solenoid valve, and wherein the hot gas solenoid valve is a high pulse count solenoid valve.

13. The method of claim 9, wherein the solenoid valve is a hot gas solenoid valve, and wherein adjusting, via the TRS controller, the variable duty cycle percentage of the solenoid valve in a manner that compensates for the non-linear relationship between the variable duty cycle percentage and the mass-flow of the refrigeration circuit based on the temperature difference and the calculated duty cycle gain to provide temperature control within the internal space of the refrigerated transport unit includes adjusting, via the TRS controller, a duty cycle percentage of the hot gas solenoid valve based on the temperature difference and the calculated duty cycle gain to control an amount of hot gas directed to the evaporator.

14. The method of claim 10, wherein alternately pulsing the liquid line solenoid valve and the hot gas solenoid valve as the measured internal temperature is dropping towards the desired set point temperature includes pulsing the liquid line solenoid valve while the hot gas solenoid valve remains in an open state for a period of time and then pulsing the hot gas solenoid valve while the liquid line solenoid valve remains in an open state for a second period of time.

15. The method of claim 9, wherein calculating the duty cycle gain of the solenoid valve based on the previous duty cycle percentage to compensate for the non-linear relationship between the variable duty cycle percentage and the mass-flow of the refrigeration circuit includes:

comparing the measured internal space temperature with the desired set point temperature, determining a preliminary duty cycle percentage for the solenoid valve based on the comparison between the measured internal space temperature with the desired set point temperature, and calculating a duty cycle gain of the solenoid valve based on the preliminary duty cycle percentage and a previous duty cycle percentage to compensate for the non-linear relationship between the variable duty cycle percentage and the mass-flow of the refrigeration circuit; and wherein adjusting, via the TRS controller, the variable duty cycle percentage of the solenoid valve based on the calculated temperature difference and the calculated duty cycle gain of the solenoid valve includes adjusting, via the TRS controller, the preliminary duty cycle percentage of the solenoid valve based on the duty cycle gain.

* * * * *